United States Patent
Jarboe et al.

(10) Patent No.: US 6,795,108 B2
(45) Date of Patent: Sep. 21, 2004

(54) SYSTEM AND METHOD FOR VIDEO CONFERENCE SERVICE

(75) Inventors: Andre D. Jarboe, Stone Mountain, GA (US); Donna K. Hodges, Cumming, GA (US); Barrett M. Kreiner, Norcross, GA (US); Jeffrey Lee Mitchell, Lilburn, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 21 days.

(21) Appl. No.: 10/350,433

(22) Filed: Jan. 24, 2003

(65) Prior Publication Data

US 2004/0145650 A1 Jul. 29, 2004

(51) Int. Cl.[7] ................................................. H04N 7/14
(52) U.S. Cl. ............................. 348/14.09; 379/93.21; 379/202.01; 709/204
(58) Field of Search ........................... 348/14.01, 14.03, 348/14.05, 14.08–14.12; 379/93.21, 201.01, 202.01, 204.01, 219; 709/204

(56) References Cited

U.S. PATENT DOCUMENTS

| | | | | |
|---|---|---|---|---|
| 5,847,752 A | * | 12/1998 | Sebestyen | 348/14.12 |
| 6,148,072 A | * | 11/2000 | Huang | 379/219 |
| 6,604,129 B2 | * | 8/2003 | Slutsman et al. | 709/204 |
| 6,633,324 B2 | * | 10/2003 | Stephens, Jr. | 348/14.09 |

OTHER PUBLICATIONS

"Shasta Portofolio–Shasta 5000 Broadband Service Node (BSN)", www.nortelnetworks.com/products/01/shasta/bsn/index, 1 page.

"Hotwire ® 5000/6000 Series Plain Old Telephone Service (POTS) Filters and Splitters Data Sheet", www.paradyne.com/products/pots splitter data sheet, 4 pages.

* cited by examiner

Primary Examiner—Wing F. Chan
(74) Attorney, Agent, or Firm—Woodcock Washburn LLP

(57) ABSTRACT

A user may initiate a video conference session by dialing a predefined code on their telephone and thereafter dialing the telephone number of the party with whom it is desired to establish the video conference. An AIN network retrieves pre-stored information regarding the characteristics of the computing systems to be included in the video conference. Thereafter, the network automatically establishes communication between the computing devices.

24 Claims, 5 Drawing Sheets

SYSTEM AND METHOD FOR VIDEO CONFERENCE SERVICE

FIELD OF THE INVENTION

The present invention relates generally to the field of telecommunications, and more particularly, to an intelligent or advanced application, such as an Advanced Intelligent Network (AIN) application, for automatically establishing a video conference session.

BACKGROUND

Desktop video conferencing is a relatively new computer application that has received significant interest. Desktop video conferencing allows individuals, who may be remotely located from each other, to see and hear each other using a computer system interface. A user with access to a computing system such as a personal computer is able to see and hear another person who similarly has access to an adequately equipped computer interface. Typically, audio and video data are communicated between computing systems over a network such as the Internet.

Generally, a computing system for engaging in a desktop video conferencing session comprises specialized software and hardware. Specifically, a system might comprise a camera for collecting images, a microphone for collecting voice input, speakers for playing voice output, and a display monitor for displaying images. A computing system suitable for video conferencing may also comprise software for performing functions related to the video conference including the following: receiving inputs from input peripheral devices, transmitting the received data to another computing system, receiving video and audio data from the other computing systems, and controlling the output peripheral devices to present the received video and audio data.

In existing systems, establishing a video conference session requires the operator of a first system to coordinate with the operator of a second computing system to insure that the software and peripherals of their respective systems are compatible and operational. Furthermore, existing video conferencing systems require that both parties establish an account with a video conferencing service and be logged into that service when it is desired to establish a video conference. Often, coordinating system compatibility and simultaneous log-in to a video conference service is a non-trivial task that requires significant human interaction.

SUMMARY

Illustrative systems and methods for establishing a video conference session are disclosed herein. An illustrative system for establishing a video conference session comprises a first service switching (SSP) point, a second SSP, and a service control point (SCP). A user that desires to establish a video conference session dials a designated key sequence such as, for example, *23 on their telephone. This defined key sequence is detected at the first SSP and indicates to the SSP that a video conference is being requested. Thereafter, the user dials a telephone number, wherein the number is recognized by the SSP as the telephone number of the party with which it is desired to establish a video conference session.

The first SSP communicates a request to the SCP to query pre-stored information identifying characteristics of the computing systems associated with the telephone number from which the request was made and characteristics of the telephone number with which it is has been requested to establish a connection. The first SSP uses information received from the SCP to forward instructions for activating a computing system at the first telephone number. The second SSP uses information retrieved by the SCP to forward instructions for activating a computing system at the second telephone number. After both systems have been activated, data is communicated between the two.

BRIEF DESCRIPTION OF THE DRAWINGS

Other features of illustrative systems and methods for providing a video conferencing service are further apparent from the following detailed description of presently preferred exemplary embodiments taken in conjunction is with the accompanying drawings, of which.

DETAILED DESCRIPTION OF THE INVENTION

Exemplary systems and methods for providing a video conferencing service are described below with reference to FIGS. 1–3. It will be appreciated by those of ordinary skill in the art that the description given herein with respect to those figures is for exemplary purposes only and is not intended in any way to limit the scope of the potential embodiments.

Generally, the illustrative system for providing video conferencing services comprises features of an advanced intelligent network (AIN). AIN's evolved out of a need to increase the capabilities of the telephone network architecture in order to meet the growing needs of telephone customers or users. The AIN architecture generally comprises two networks, a data messaging network and a trunked communications network. The trunked communications network handles voice and data communications between dispersed network locations, whereas the data messaging network is provided for controlling operations of the trunked communications network. AIN systems are described in U.S. Pat. No. 5,701,301, which is incorporated herein by reference in its entirety. An AIN network with advanced intelligent network capabilities may be utilized to implement various features and aspects of the disclosed illustrative method for providing video conferencing services. It should be noted, however, potential embodiments for providing video conferencing services are not limited to AIN-based networks and other advanced or intelligent networks and arrangements may be used.

Figure 1:
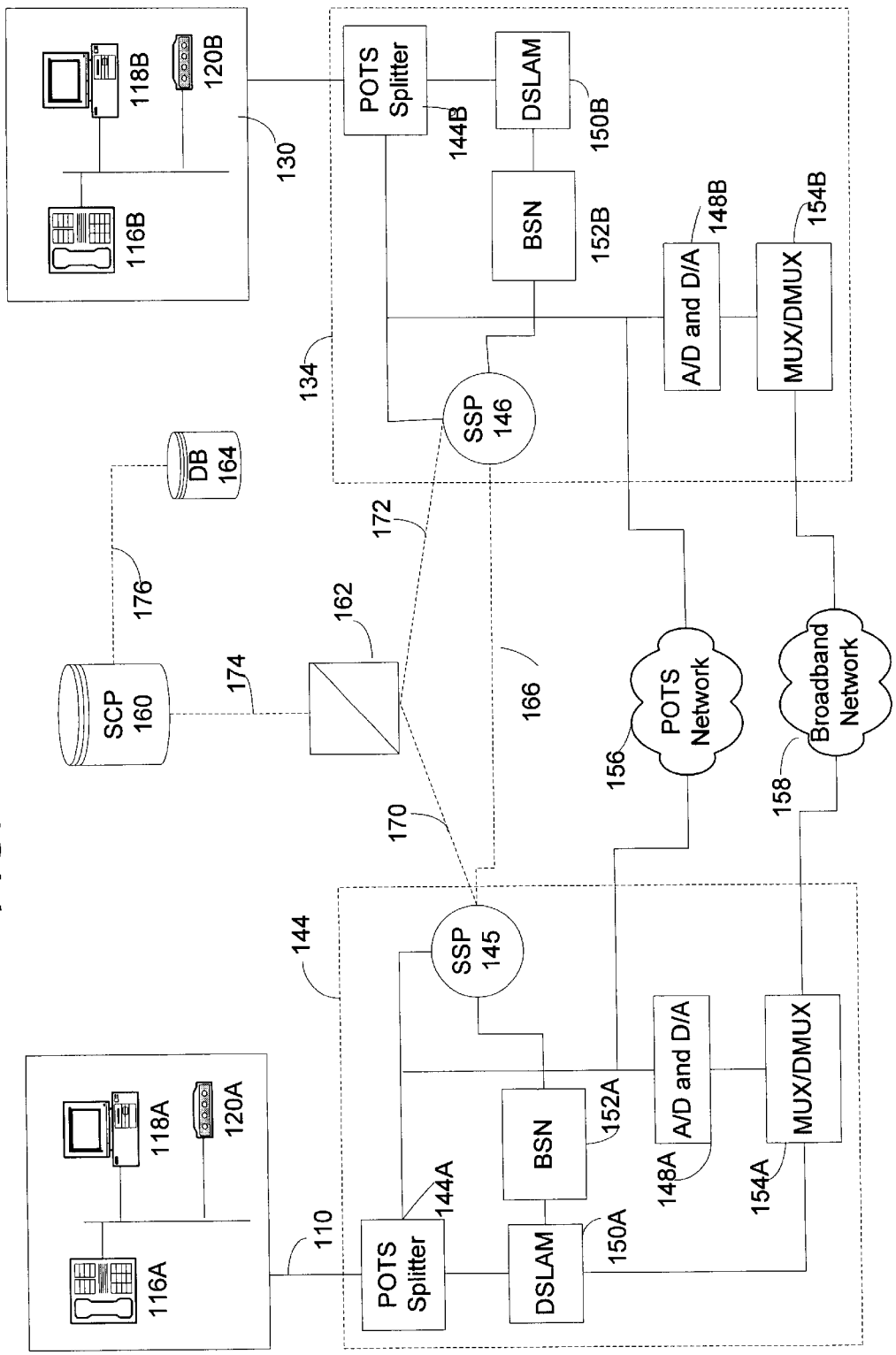
FIG. 1 is a high level diagram of an exemplary network system in which to provide video conferencing services.

Referring now to the accompanying drawings, FIG. 1 depicts an exemplary network for providing video conferencing services. In the exemplary embodiment of FIG. 1, the network comprises a first telephone service line 110 for communicating between location 112, which may be a home or office, and central office (CO) 114. Within location 112, there may be located telephone 116A, computing system 118A, and digital subscriber line (DSL) modem 120A. Telephone 116A provides for audio communication over telephone service line 110 while computing system 118A together with DSL modem 120A provide data communication over telephone service line 110. Telephone service line 130 provides a similar communication link between location 132 and CO 134. Location 132 is likewise equipped with telephone 116B, computing system 118B, and DSL modem 120B, and CO 134.

Telephone service lines 110 and 130 communicate with central office (CO) locations 114 and 134 respectively. As shown, comprised within CO's 114 and 134 are the following: splitters 144A and 144B; SSP's 145 and 146; analog-to-digital (A/D) and digital-to-analog (D/A) converters 148A and 148B; digital subscriber line access multiplexors (DSLAM) 150A and 150B; broadband service node (BSN) 152A and 152B; and multiplexor/demultiplexor 154A and 154B. Splitters 144A and 144B operate to split analog telephone signals from DSL signals. Thus, when a signal is received over telephone lines 120 and 130 at splitters 144A and 144B, the signal, if digital, is routed to DSLAM's 150A and 150B, and if analog, is routed to SSP's 145 or 146. DSLAM's 150A and 150B are multiplexors for DSL modem cards and may be any one of numerous devices manufactured by Nortel Networks Inc., Lucent Technologies, or similar companies. BSN's 152A and 152B are computing systems that allow for implementation of specialized services on individual broadband lines and may be any of the BSN devices manufactured by Nortel Networks, Lucent Technologies, and similar companies. A/D and D/A converters 148A and 148B convert signals between analog and digital formats and are employed when, as described below, analog signals are converted and combined with digital signals. Mutiplexors/Demultiplexors 154A and 154B combine two signals into one and in reverse convert a single signal into two signals.

Generally, standard audio signals created at telephones 116A and 116B are routed through splitters 144A and 144B, out of the CO's 114 and 134, and across plain old telephone systems (POTS) network 156. Data communicated from computing systems through DSL modems 120A and 120B is routed through DSLAM's 150A and 150B onto broadband network 158, which may be an internal network but may also comprise portions of a public network such as the Internet. In some instances, audio signals generated at telephones 116A and 116B may be directed through A/D and D/A converters 148A and 148B and multiplexed by MUX/DMUX 154A and 154B with the digital signals from DSLAM's 150A and 150B.

SSP's 145 and 146 are AIN enabled switches that operate to control the routing of calls within the network. These switches may be manufactured by, for example, Lucent Technologies, Inc., or Nortel. Each switch may include different types of facilities and/or triggers. SSP's 145 and 146 are each programmable switches which perform the following functions: recognize AIN-type calls, launch queries to service control point (SCP) 160 via STP 162, and receive commands and data from SCP 160 to further process and route AIN-type calls. When one of SSP's 145, 146 is triggered by an AIN-type call, the triggered SSP formulates an AIN service request and responds to call processing instructions from the network element in which the AIN service logic resides. In the exemplary embodiment, the AIN service logic may reside in a database 164 communicatively coupled to or residing in SCP 160.

As further shown in FIG. 1, SSP 145 is connected to SSP 146 over trunk 166. Trunk 160 may be either a SS7 controlled intermachine trunk (IMT), or primary rate interface (PRI) trunk and the type of trunk will be in accordance with both the sending and receiving SSP to which it is connected. If either of SSP's 145, 146 is a 1AESS type switch, the trunk may be an SS7 controlled IMT type trunk as the 1AESS is typically not capable of supporting PRI trunks. However, if both the sending and receiving switches are either a DMS-100 switch or a 5ESS switch, the trunk may be either an SS7 controlled IMT type trunk or PRI type trunk.

AIN SSP's 145 and 146 may allow normal switch processing to be suspended at specific points in a call so that the switch may send an AIN message query via signaling transfer point (STP) 162 to SCP 160. SCP 160 may execute software based service logic and return call-processing instructions to the triggering AIN SSP. New services may be provisioned by assigning AIN SSP triggers to customer lines, trunks, and/or NANP telephone numbers.

In order to facilitate signaling and data messaging, each SSP 145 and 146 is equipped with Common Channel Signaling (CCS) capabilities, e.g., SS7, which provides two-way communications of data messages over CCS links 170, 172, 174, and 176 between components of the AIN network. The data messages may be formatted in accordance with the Transaction Capabilities Applications Part (TCAP). Alternatively, ISDN Users Part (ISUP) may be used for signaling purposes between, for example, SSP's 145 and 146. In such a case, SSP's 145 and 146 may be equipped with the capability to map appropriate data between TCAP and ISUP protocols, and vice versa. The telephone network essentially employs an upper-level software controlled network through the STP's and the SCP (and/or ISCP). The software presides over the hardware to check the call route and the availability of connection prior to hardware connection.

Accordingly, the connections by links 170, 172, 174, and 176 are for signaling purposes and allow SSP's 145 and 146 to send and receive messages to and from SCP 160 via STP 162. Various features of an exemplary system for providing video conferencing services are described herein from the standpoint of a switch implementing AIN protocols, and the CPR provisioned with TAT, 10D or DLN triggers. However, as will be apparent to those of ordinary skill in the art based on the disclosure provided herein, the potential embodiments for providing video conferencing services are not limited to implementation to a specific release of AIN protocols and may be designed and provisioned with a network utilizing triggers associated with future AIN releases and trigger types. One skilled in the art will further recognize that the above-described network is a simplified network meant for explanatory purposes. It is likely that a telephone network may comprise numerous user stations, SSP'S, STP's, and SCP's along with other telephone network elements.

Figure 2:
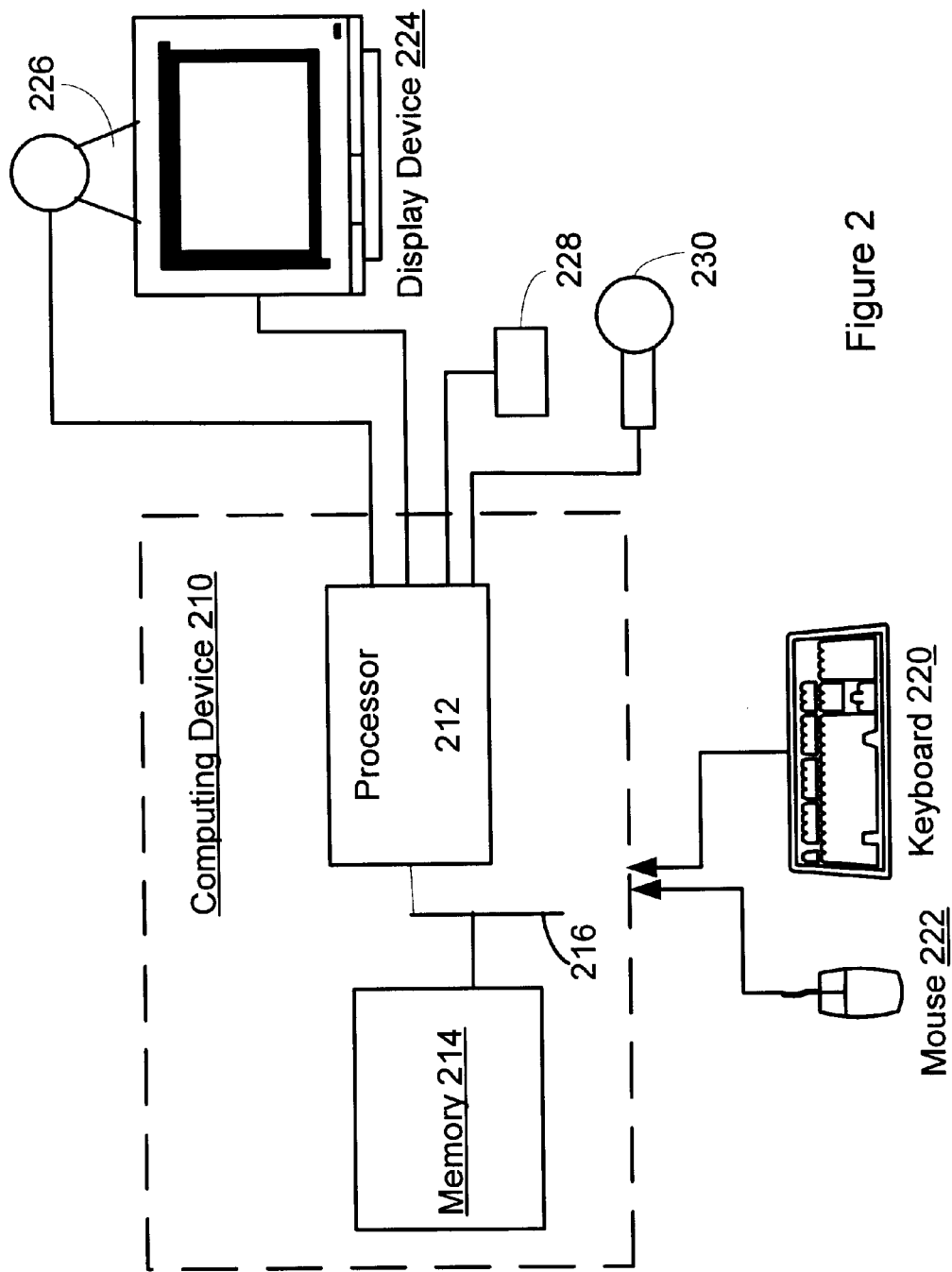
FIG. 2 is a diagram of a computing device operable for use in performing the disclosed method.

FIG. 2 is a diagram of a computing system suitable for use in the network of FIG. 1. For example, the system of FIG. 2 may be employed as computing system 118 of FIG. 1. Referring to FIG. 2, computing system 210 comprises processor 212, system memory 214, and system bus 216 that couples various system components including system memory 214 to processor 212. System memory 214 may include read-only memory (ROM) and/or random access memory (RAM). Computing device 210 may further include hard-drive, which provides storage for computer readable instructions, data structures, program modules, data, and the like. A user (not shown) may enter commands and information into the computing device 210 through input devices such as keyboard 220 or mouse 222. A display device 224, such as a monitor, a flat panel display, or the like is also connected to computing device 210. A camera 226 provides the capability to record still and video images. Speaker 228 provides audio output and microphone 230 provides audio input. System memory 214 may be loaded with any one of several computer operating systems such as WINDOWS NT operating system, WINDOWS 2000 operating system, LINUX operating system, and the like. Additionally, memory 214 might have software loaded thereon for controlling video conferencing. Specifically, memory 214 might have software thereon for controlling inputs from microphone 230 and camera 226, as well as controlling output to speaker 228 and display 224.

It is presumed for purposes of this illustration that subscribers to telephone service lines 110 and 130 have previously subscribed to the video conferencing service described herein and have previously provided information regarding computing systems 118A and 118B with which the video conferencing sessions are to be provided. This characteristic information of computing systems 118A and 118B, including, for example, the number and types of peripherals as well as the software loaded thereon, may be stored on SCP 176 and/or database 164. In an embodiment of the disclosed system and method, during the registration/subscription procedure, systems 118A and 118B may be loaded with video conferencing software for coordinating inputs from the input peripherals and coordinating outputs to the output peripherals. In an alternative embodiment, video conferencing software is downloaded upon establishing a video conference session as discussed below.

Figure 3A:
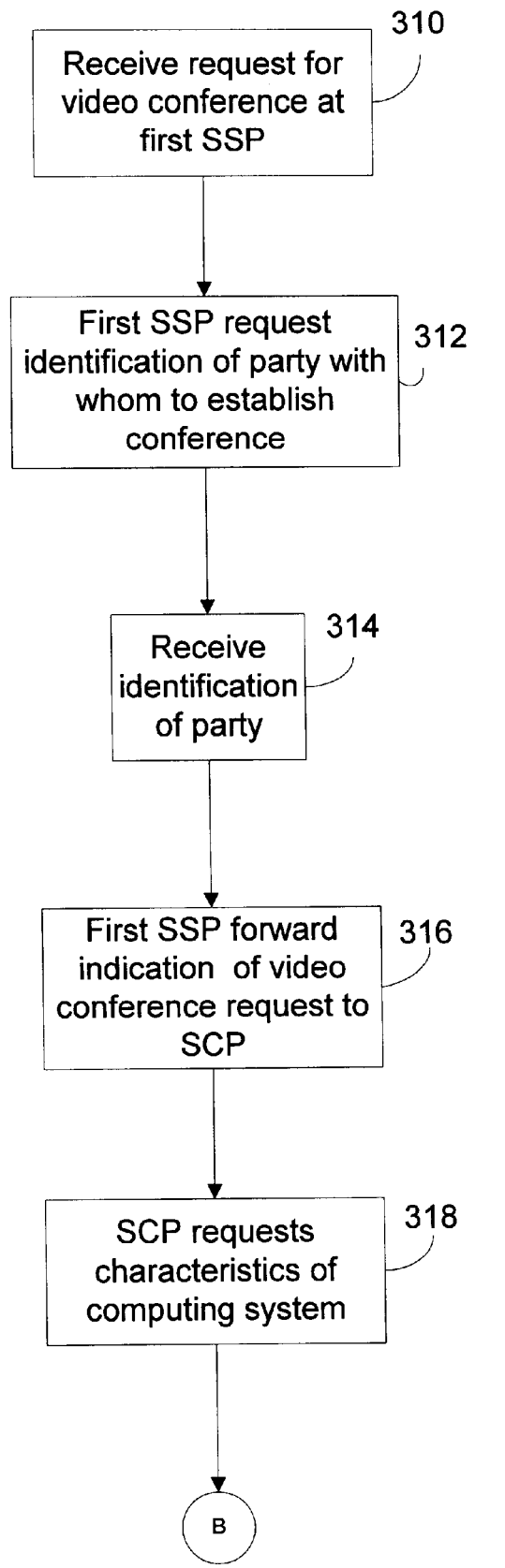
FIGS. 3A–C comprise a flow chart of an exemplary method for providing video conferencing services.
Figure 3B:
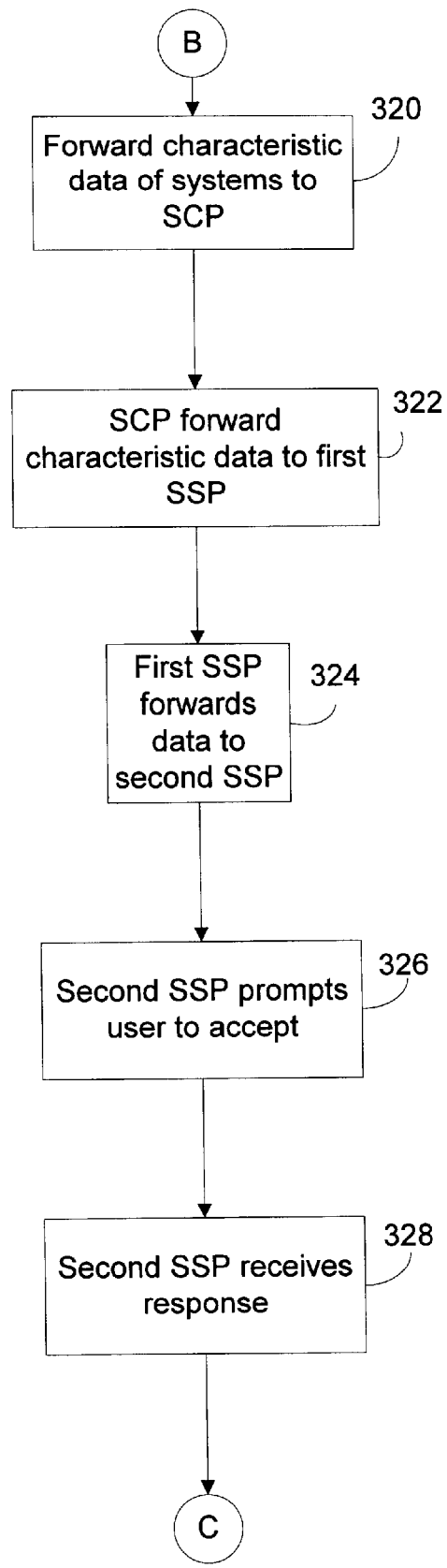
Figure 3C:
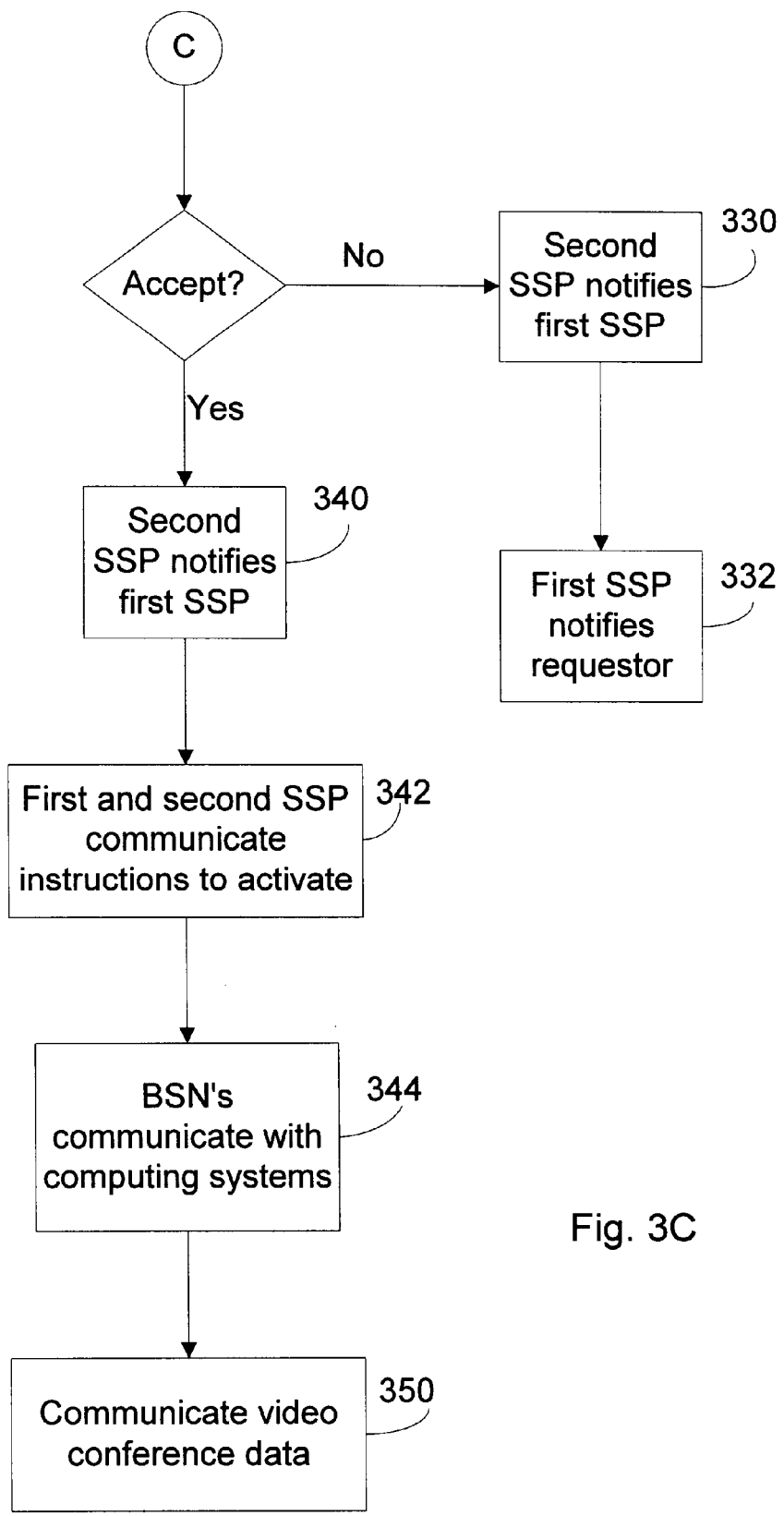

FIG. 3 depicts a flow chart of a method for providing a video conferencing service. As shown, at step 310, SSP 145 receives a request to establish a video conference session. For example SSP may receive a service activation key sequence that was transmitted over telephone service line 110 from either telephone 116 or computing system 118. The service activation key sequence may cause to be generated a defined sequence of dual tone multi frequencies such as, for example, a sequence representing *23. As a result of the subscriber to telephone service line 110 previously having subscribed to the video conferencing service, an AIN trigger has been provisioned at SSP 145. Accordingly, when the defined key sequence is received at SSP 145, SSP 145 identifies this defined sequence as signaling a request for establishing a video conferencing session from telephone service line 110. At step 312, SSP 145 prompts the user for the party with whom it is desired to establish a video conference. Specifically, SSP 145 generates stuttered dial tone on telephone service line 110 to signal to the operator to provide the telephone number with which it is desired to establish a video conference session. At step 214, SSP 145 receives and indication, in the form of a telephone number, of the party with whom it is desired to establish a video conference session. For purposes of this illustration, it is presumed that the telephone number received is that for telephone service line 130.

At step 316, SSP 145 forwards an indication to SCP 160 that a video conference session has been requested from telephone service line 110 for communication with telephone service line 130. At step 318, SCP 160 requests the characteristics of the computing systems associated with service lines 110 and 130 from database 164. Database 164 queries for the characteristics of computing systems associated with lines 110 and 130, which in the exemplary system of FIG. 1 are systems 118A and 118B respectively. According to an embodiment wherein systems 118A and 118B have not previously been loaded with video conferencing software, database 164 might also search for and retrieve video conferencing software appropriate for use with each of the system. At step 320, the characteristic data and, if necessary, any video conference software is forwarded to SCP 176. At step 322, the characteristic data and, if not previously loaded onto systems 118A and 118B, any video conferencing software is forwarded to SSP 145.

At step 324, SSP 145 forwards an indication to SSP 146 that a request has been received to establish a video conference session at telephone service line 130 along with information regarding system 118B. At step 326, SSP 146 initiates a telephone session with telephone 116B and causes an audio prompt to be played indicating that video conference session has been requested from telephone service line 110 and requesting an input to either accept or reject the request. In an alternative embodiment, or perhaps in addition to forwarding an audio prompt, SSP 146 might also cause to be forwarded (through BSN 152B) to computing system 118B a visual prompt to accept or reject the request for a video conference. At step 328, the response is received at SSP 146. If the request to establish a video conference is rejected, at step 330, SSP 146 notifies SSP 145 that the request for a video conference has been rejected. Thereafter, at step 232, SSP 145 notifies the originator, either by playing a recording at telephone 116A or by causing a notification to be displayed at computing system 118A.

If at step 228 SSP 146 receives an acceptance of the request to establish a video conference, at step 340, SSP 146 forwards an indication to SSP 145 that the request has been accepted. Thereafter, at step 342 SSP's 145 and 146 communicate instructions to activate video conference capabilities at the respective computing systems 118A and 118B. In particular, SSP's 145 and 146 forward instructions to BSN's 152A and 152B to initiate video conference connections with systems 118A and 118B. The instructions may comprise the information regarding computing systems 118A and 118B retrieved by SCP 160. In another embodiment, the instructions might also comprise video conferencing software, which also might have been received from SCP 160. At step 344, BSN's 152A and 152B communicate with systems 118A and 118B through DSLAM's 150A and 150B to activate systems 118A and 118B. Activating systems 118A and 118B might include, for example, turning on input peripheral devices and output peripheral devices, if not already on, and initiating execution of video conferencing software.

At step 350, data from computing systems 118A and 118B is routed to each other over network 158 and possibly over POTS network 1565. According to a potential embodiment, video conferencing software at systems 118A and 118B may collect video data via camera 226 and audio data via microphone 230. In this embodiment, at step 350, both audio and video data from computing systems 118A and 118B is routed through DSLAM's 150A and 150B to MUX/DMUX's 154A and 154B. Thereafter, the data is carried through broadband network 158 to the other of the CO pair. In an alternative embodiment, systems 118A and 118B might be configured to collect only video data and not audio data. In such an embodiment, the audio interface may be provided by telephones 116A and 116B. In such an embodiment, at step 350 audio data for the video conference may be received from telephones 116 and routed via normal means through POTS network 156, while the video data is routed via DSLAM's 150A and 150B over broadband network 158. In a further alternative embodiment, audio data collected via telephones 116A and 116B may be routed through A/D and D/A converters 148A and 148B and into MUX/DMUX's 154 where it is combined with video data before being communicated over broadband network 158.

Thus, systems and methods for providing video conferencing services have been disclosed. In an illustrative embodiment, a user may initiate a video conference session by dialing a predefined code on their telephone and thereafter dialing the telephone number of the party with whom it is desired to establish the video conference. A network retrieves pre-stored information regarding the characteristics of the computing systems to be included in the video conference. Thereafter, the network automatically establishes communication between the computing devices.

While systems and methods have been described and illustrated with reference to specific embodiments, those skilled in the art will recognize that modification and variations may be made without departing from the principles described above and set forth in the following claims. For example, while the system has been described as comprising AIN network elements, other logic computing systems may be used as well. Also, while one embodiment provides for audio and video data may be collected at the computing systems, audio data may be collected separately by telephones. Accordingly, reference should be made to the following claims as defining the scope of potential embodiments.

What is claimed is:

1. A method for establishing a video conference session, comprising:
    receiving a request to establish a video conference session;
    identifying from the request, a first telephone number from which the request was received;
    identifying a second telephone number with which it is requested to establish a video conference session;
    determining characteristics of a first computing system associated with the first telephone number;
    determining characteristics of a second computing system associated with the second telephone number;
    communicating instructions to the first telephone number, said instructions for activating video conference capabilities at the first computing system;
    communicating instructions to the second telephone number, said instructions for activating video conference capabilities at the second computing system; and
    communicating data related to video conferencing between the first computing system and the second computing system.

2. The method of claim 1, wherein receiving a request to establish a video conference comprises receiving a defined sequence of dual tone multi frequencies.

3. The method of claim 2, wherein receiving a request to establish a video conference further comprises generating stuttered dial tone.

4. The method of claim 3, wherein receiving a second telephone number comprises receiving dual tone multi frequencies corresponding to a telephone number.

5. The method of claim 1, wherein determining characteristics of a first computing system associated with the first telephone number comprises searching a database for information stored in relation with the first telephone number.

6. The method of claim 1, wherein determining characteristics associated with the second computing system comprises searching a database for information associated with the second telephone number.

7. The method of claim 1, wherein communicating instructions to the first telephone number comprises communicating instructions to prepare the first computing system for a video conference session.

8. The method of claim 1, wherein communicating instructions to the second telephone number comprises communicating instructions to prepare the second computing system for a video conference session.

9. The method of claim 1, wherein communicating data related to video conferencing comprises communicating audio data and video data.

10. The method of claim 1, wherein communicating data related to video conferencing between the first and computing system and the second computing system comprises communicating audio data over a PSTN network and communicating video data over a broadband network.

11. The method of claim 1, wherein communicating data related to video conferencing between the first computing system and the second computing system comprises multiplexing audio and video data, communicating multiplexed audio and video data, and demultiplexing audio and video data.

12. The method of claim 1, further comprising determining whether a video conference session has been accepted at said second telephone number.

13. The method of claim 12, wherein determining whether a video conference session has been accepted at said second telephone number comprises transmitting a prompt to said second telephone number to accept or reject the video conference session.

14. The method of claim 13, wherein transmitting a prompt to said second telephone number comprises transmitting a message for display on said second computing system.

15. The method of claim 13, wherein transmitting a prompt to said second telephone number comprises transmitting a recorded message.

16. A method for establishing a video conference session, comprising:
    receiving at a first service switching point from a telephone service line associated with a first telephone number, a dual tone multi frequencies sequence corresponding to a video conference service;
    receiving at the first service switching point from the telephone service line associated with the first telephone phone number, a second telephone number with which it is requested to establish a video conference session;
    at a service control point, identifying characteristics of a first computing system corresponding to the first telephone number and identifying characteristics of a second computing system corresponding to the second telephone number;
    at the first service switching point, communicating instructions, said instructions for activating video conference capabilities at the first computing system;
    at a second service switching point communicating instructions, said instructions for activating video conference capabilities at the second computing system; and
    at the first service switching point and the second service switching point, transmitting instructions to communicate video conference data between the telephone service line corresponding to the first telephone number and the telephone service line corresponding to the second telephone number.

17. The method of claim 16, further comprising, at the first service switching point causing stuttered dial tone to be generated on the telephone service line associated with a first telephone service.

18. The method of claim 16, wherein receiving a second telephone number comprises receiving dual tone multi frequencies corresponding to a telephone number.

19. The method of claim 16, wherein identifying characteristics of a first computing system corresponding to the first telephone number and identifying characteristics of a second computing system corresponding to the second telephone number comprises searching a database for information stored in relation with the first telephone number and for information stored in relation with the second telephone number.

20. The method of claim 16, wherein communicating instructions for activating video conference capabilities at the first computing system comprises communicating instructions for activating software and hardware.

21. The method of claim 16, wherein communicating instructions for activating video conference capabilities at the second computing system comprises communicating instructions for activating software and hardware.

22. The method of claim 16, further comprising, at the second service switching point, establishing a telephone call to the second telephone number.

23. The method of claim 22, further comprising at the second service switching point, transmitting to the telephone line corresponding to the second telephone number an indication that a video conference session has been requested by the first telephone number.

24. The method of claim 23, wherein transmitting to the telephone line corresponding to the second telephone number an indication that a video conference session has been requested comprises transmitting a prompt to said second telephone number to accept or reject the video conference session.

* * * * *